(12) United States Patent
Polkovnikov et al.

(10) Patent No.: US 9,378,460 B2
(45) Date of Patent: Jun. 28, 2016

(54) METHOD AND APPARATUS FOR PROVISIONING STORAGE RESOURCES USING AN EXPERT SYSTEM THAT DISPLAYS THE PROVISIONING TO A USER

(71) Applicant: EMC Corporation, Hopkinton, MA (US)

(72) Inventors: Alexey Alexandrovich Polkovnikov, St. Petersburg (RU); Dmitry Nikolayevich Tylik, St. Petersburg (RU); Sergey Alexandrovich Alexeev, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 265 days.

(21) Appl. No.: 14/122,396

(22) PCT Filed: Dec. 28, 2012

(86) PCT No.: PCT/IB2012/003081
§ 371 (c)(1),
(2) Date: Nov. 26, 2013

(87) PCT Pub. No.: WO2014/102564
PCT Pub. Date: Jul. 3, 2014

(65) Prior Publication Data
US 2014/0324767 A1    Oct. 30, 2014

(51) Int. Cl.
*G06F 17/00*    (2006.01)
*G06N 5/04*    (2006.01)
*G06F 3/06*    (2006.01)

(52) U.S. Cl.
CPC .............. *G06N 5/043* (2013.01); *G06F 3/0629* (2013.01); *G06N 5/04* (2013.01)

(58) Field of Classification Search
CPC ...................................................... G06F 3/0629
USPC ............................... 706/12, 45; 711/170–173
See application file for complete search history.

(56) References Cited

U.S. PATENT DOCUMENTS 6,058,454 A * 5/2000 Gerlach ................ G06F 3/0607 710/10
7,676,552 B2 * 3/2010 Eilam ................... G06F 9/5061 379/242

(Continued)

FOREIGN PATENT DOCUMENTS

WO    9427232 A1    11/1994

OTHER PUBLICATIONS

Giarranto, Joseph C., et al., Expert Systems, principles and programming, fourth edition. Moskava, Sankt-Peterburg, Kiev, Izataldesky dom "Williams," 2007.

*Primary Examiner* — David Vincent
(74) *Attorney, Agent, or Firm* — BainwoodHuang

(57) ABSTRACT

An improved technique uses an expert system to provide automated provisioning of resources for a storage system. Along these lines, a user submits values of a set of provisioning targets parameters in a administrative interface screen to a storage processing device. The expert system uses these values to form a set of facts within an expert system stored on the storage processing device that includes a knowledge base having a set of logical rules and an inference engine. The storage processing device then inputs these facts and logical rules into the inference engine which is configured to fire logical rules having preconditions that match the facts. The actions of these logical rules then provide content for the provisioning of the storage resources, which are displayed to the user or used for automatic storage provisioning operations.

20 Claims, 4 Drawing Sheets

(56) References Cited

U.S. PATENT DOCUMENTS

| | | | | |
|---|---|---|---|---|
| 8,307,362 B1 * | 11/2012 | Gong | ................ | G06F 9/5077 718/1 |
| 8,375,190 B2 * | 2/2013 | Hamilton | ................ | G06F 3/061 711/156 |
| 8,554,711 B2 | 10/2013 | Matignon et al. | | |
| 8,813,235 B2 | 8/2014 | Sidagni | | |
| 2006/0161752 A1 * | 7/2006 | Burkey | ................ | G06F 3/0605 711/170 |
| 2012/0254567 A1 * | 10/2012 | Umbehocker | ........ | G06F 3/0604 711/162 |
| 2013/0036266 A1 * | 2/2013 | Naganuma | .............. | G06F 3/061 711/114 |

* cited by examiner

METHOD AND APPARATUS FOR PROVISIONING STORAGE RESOURCES USING AN EXPERT SYSTEM THAT DISPLAYS THE PROVISIONING TO A USER

BACKGROUND

Some data storage systems include complex arrangements of storage disk arrays, configuration management interfaces, and storage processors. A system administrator faces many choices in making adjustments to the configuration of a data storage system in response to changing conditions, many of them resulting in suboptimal performance. Along these lines, the system administrator may seek advice with regard to provisioning storage resources while running certain applications. Such advice typically follows application best practices that convert storage provisioning needs into a specification of storage resources such as storage type, RAID type, de-duplication, etc.

A conventional approach to automating storage resource provisioning employs software that allows an administrator to provision storage resources based on predefined provisioning best-practices algorithms. Such software can employ a scripting language, such as the well-known Lua scripting language, that expresses the application best practices in procedural logic. The administrator may account for changes in application best practices by arranging for adjustments to the software to reflect those changes.

SUMMARY

Unfortunately, there are deficiencies with the above-described conventional approaches to automating storage resource provisioning. For example, the scripting languages in which the application best practices are expressed are static in nature. Thus, the procedural logic in which the application best practices are encoded is tied to rigid constructs that require specific software engineering skills in order to implement modifications. Also, when using such a scripting language, reuse of knowledge embedded in the provisioning decision-making procedures is limited to function-calling mechanisms. Such a limitation hinders extending and improving this knowledge. It is also complicated to incorporate different logic for provisioning decision-making; the logic may depend on different provisioning targets (e.g., a specific application, SLA, or policy).

In contrast to conventional approaches to automating storage resource provisioning in which changes are difficult to implement, an improved technique uses an expert system to provide automated decisions for provisioning of resources for a storage system. Along these lines, a user submits values of a set of provisioning operation targets in a storage administration interface to a storage processing device. The expert system uses these values to form a set of facts within an expert system stored on the storage processing device that includes a knowledge base having a set of logical rules and an inference engine. The storage processing device then inputs these facts and logical rules into the inference engine which is configured to fire logical rules having preconditions that match the facts. The actions of these logical rules then provide content for the provisioning of the storage resources, which the storage administration interface displays to the user.

Advantageously, the improved technique provides a platform for automating storage resource provisioning in which adjustments to provisioning decision-making logic are easily made without requiring professional software engineering skills. Expert systems allow for simple logical statements to express the rules defining the knowledge embedded in provisioning decision-making algorithms. The platform collects such logical statements in a knowledge base from where adjustments to the logical statements can be made with ease in a simple language. Further, the logical statements in the knowledge base are reused by the different storage platforms that may all benefit from the knowledge embedded in the logical statements. The provisioning knowledge is platform-independent.

One embodiment of the improved technique is directed to a method of provisioning storage resources for a storage system. The method includes receiving, from a user, a request to provision storage resources for the storage system, the request including values of a set of provisioning target parameters indicative of provisioning operation requirements. The method also includes producing, from the values of the set of provisioning target parameters, a set of facts, each fact of the set of facts being configured as input into an expert system that includes a knowledge base and an inference engine, the knowledge base being configured to store a set of logical rules, the inference engine being configured to derive a storage provisioning decision from the set of facts and the knowledge base by firing particular logical rules of the set of logical rules. The method further includes inputting the set of logical rules and the set of facts into the inference engine to produce the storage resource provisioning decision. The method further includes displaying the storage resource provisioning decision to the user.

Additionally, some embodiments of the improved technique are directed to a system constructed and arranged to provision storage resources for a storage system. The system includes a network interface, memory, and a controller including controlling circuitry constructed and arranged to carry out the method of provisioning storage resources for a storage system.

Furthermore, some embodiments of the improved technique are directed to a computer program product having a non-transitory computer readable storage medium which stores code, including a set of instructions to carry the method of provisioning storage resources for a storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique uses an expert system to provide automated provisioning of resources for a storage system. Along these lines, a user submits values of a set of provisioning targets parameters in a storage administration interface to a storage processing device. The expert system uses these values to form a set of facts within an expert system stored on the storage processing device that includes a knowledge base having a set of logical rules and an inference engine. The storage processing device then inputs these facts and logical rules into the inference engine which is configured to fire logical rules having preconditions that match the facts. The actions of these logical rules then provide content for the provisioning of the storage resources, which the storage administration interface displays to the user.

Advantageously, the improved technique provides a platform for automating storage resource provisioning in which adjustments to best practices are easily made without requiring professional software engineering skills. Expert systems allow for simple logical statements to express the rules defining the knowledge embedded in provisioning decision-making procedures. The platform collects such logical statements in a knowledge base from where adjustments to the logical statements can be made in a simple language. Further, the logical statements in the knowledge base are reused by the different storage platforms that may all benefit from the knowledge embedded in the logical statements. The provisioning knowledge is platform-independent.

Figure 1:
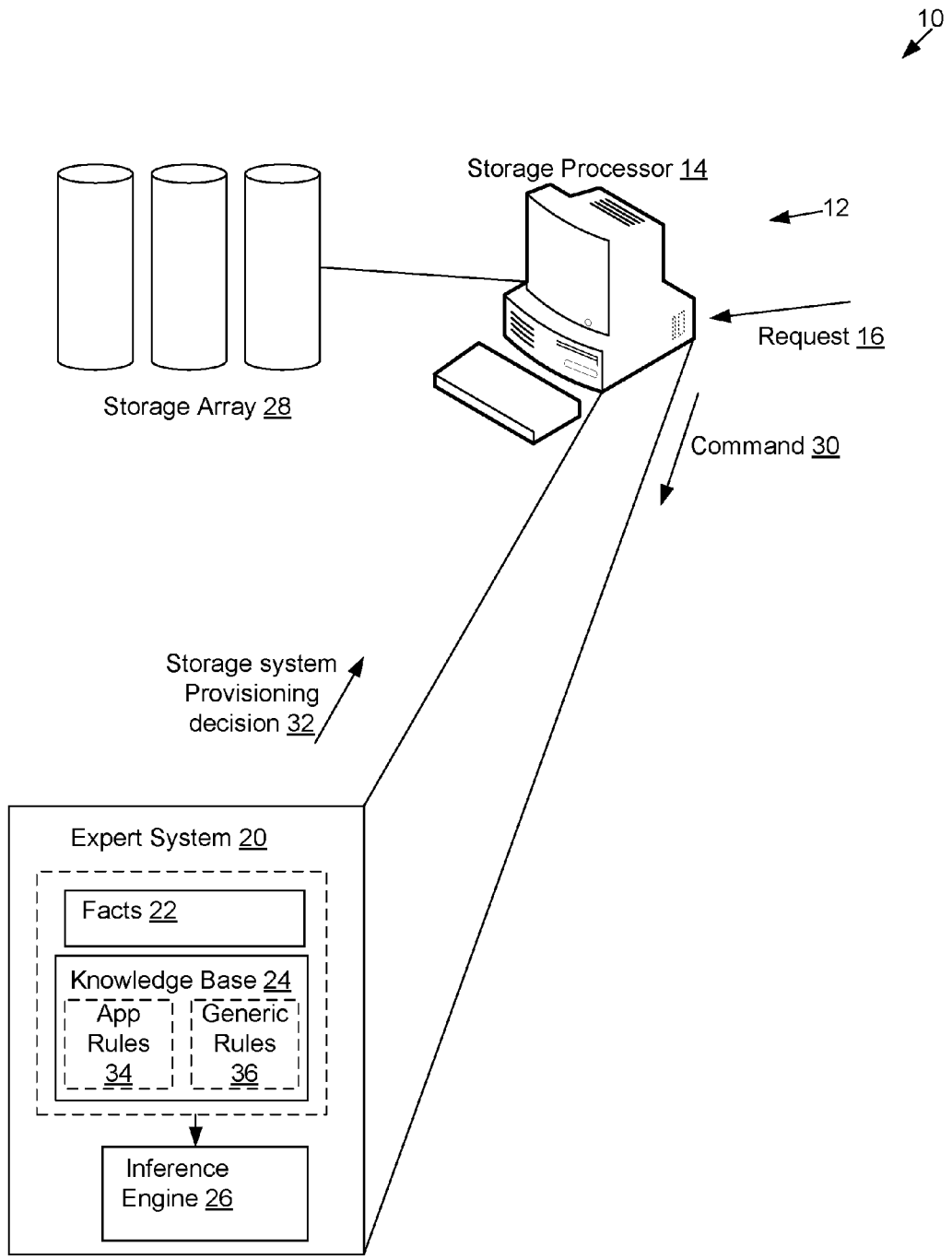
FIG. 1 is a block diagram illustrating an example electronic environment for carrying out the improved technique.

FIG. 1 illustrates an example electronic environment 10 for carrying out the improved technique. Electronic environment 10 includes storage system 12.

Storage system 12 is configured to manage data to be stored on storage array 28. Storage system 12 includes storage processor 14 and storage array 28.

Storage processor 14 is configured to run expert system 20, which includes knowledge base 24 and inference engine 26, by inputting facts 22 and relevant provisioning rules 34 into expert system 20, and extracting, as the output of expert system 20, storage system provisioning decision 32. Storage processor 14 is also configured to receive from a user (not pictured), as input, values of predefined provisioning target parameters and convert these values into facts for input into expert system 20. In some arrangements, storage processor 14 is further configured to run an administrative interface having a screen from which a user may input provisioning target parameter values. Storage processor 14 takes the form of a server computer configured to control storage array 28;

Expert system 20 is a portable expert system configured to run on storage processor 14. Expert system 20 includes knowledge base 24 and inference engine 26.

During operation, storage processor 14 receives, in the form of request 16, values of a set of provisioning target parameters; such values can include particular applications, that are required to be provisioned on the storage system, along with the application specific parameters, such as the number and average size of mailboxes for an email application, such as Microsoft® Exchange Server.

Storage processor 14 then converts the values of the set of provisioning target parameters into facts 22 for input into expert system 20. Such a conversion takes the form of a command 30 to expert system 20 to process facts 22 for storage resource provisioning. For example, suppose that wishes to provision storage resources for Microsoft® Exchange. Then storage processor 14 converts this statement into a text string such as "(assert (applicationName MSExchange))". This text string serves as a fact 22 to be input into expert system 20. Storage processor 14 performs similar conversions on other provisioning target parameter values, as will be discussed below.

Storage processor 14 then stores the fact 22 in such a way to provide expert system 20 with access to that fact 22.

Storage processor 14 selects a set of logical rules from knowledge base 24 for input into expert system 20. It should be understood that logical rules in knowledge base 24 take the form "IF <precondition> THEN <action>." Such a logical rule is said to be "fired" when the action of the logical rule is executed.

In some arrangements, the set of logical rules includes a set of application rules 34. Application rules 34 are configured to be fired by inference engine 26 in the presence of facts 22 conforming to an application fact template. For example, consider an application fact template for specifying an application having a name and a version number takes the form of a text string as follows: "(defTemplate application-fact (slot applicationName (type SYMBOL) (default none)) (slot versionNumber (type REAL)(default 0.0)))". Expert system 20 then sends a command to inference engine 26 to fire an application rule 34 when the precondition of the application rule matches a fact 22. Inference engine 26 is able to match a fact 22 to a precondition of an application rule 34 when fact 22 is expressed in an application fact template, and the parameter values in fact 22 (e.g., version number and application name) matches those in the precondition. For example, consider a fact 22, "(application-fact (applicationName MSExchange) (versionNumber 2007))". Further consider an application rule "IF (defRule EntitySizeMSExchange2007 (application-fact (applicationName MSExchange) (versionNumber 2007)) THEN (assert (StoredEntitySize (minsize 10737418240)(maxsize 2199022206976)(default 173946175488)))". Because the template and contents of fact 22 matches that of the precondition of application rule 34, inference engine 26 fires applicaton rule 34. In this case, the firing of application rule 34 results in the creation of a new fact: that the storage needs of the application are between 10737418240 and 2199022206976 bytes; lack of further specification will result in a provision of 173946175488 bytes of storage.

In some arrangements, knowledge base 24 also includes a set of generic rules 36 that represents a generic data manipulation pattern. For example, consider the following generic rule: "(defRule StoredEntityMailBox IF (applicationType (basic MailServer)) THEN (assert (storedEntity Mailbox)))". Also consider another generic rule: "(defRule MSExchange-ApplicationType IF (application (name MSExchange)) THEN (assert applicationType (basic MailServer)))". In this example, the identification of the application as having the name "MSExchange" in the latter rule will fire the assertion that the application type is a mail server. In turn, the new fact that the application type is a mail server fires the former rule that the storage entity is a mailbox.

It should be understood that inference engine 26 is configured to prioritize application rules 34 and generic rules 36 according to a predefined policy (not pictured). Such a prioritization in an agenda of inference engine 26 avoids any conflicts that may arise from disparate rules.

Further details of storage processor 14 are discussed below with respect to FIG. 2.

Figure 2:
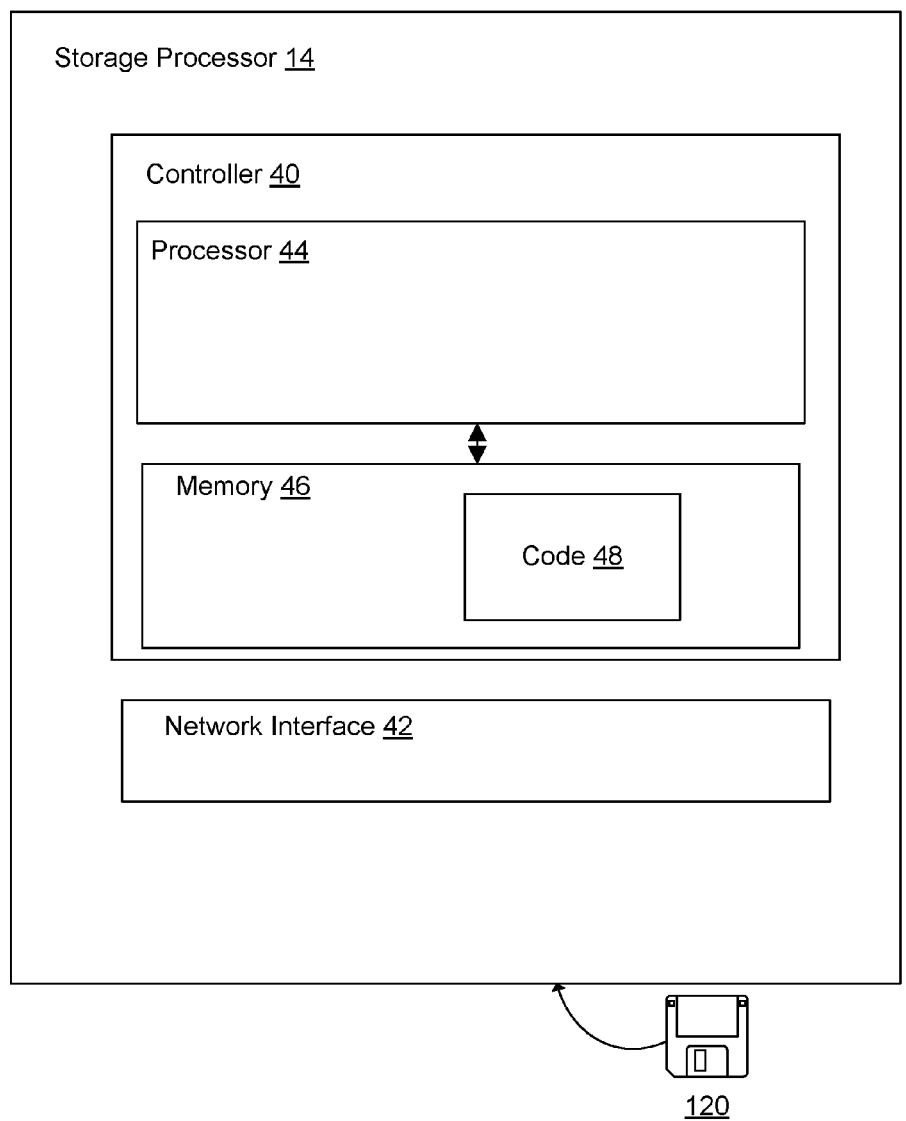
FIG. 2 is a block diagram illustrating an example storage processor within the electronic environment shown in FIG. 1.

FIG. 2 illustrates details of an example storage processor 14. Storage processor 14 includes controller 40, which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store code 48 that contains instructions configured to cause the processor to carry out the improved technique. Memory 46 generally takes the form of, e.g., random access memory, flash memory, non-volatile memory, or some combination thereof. It should be understood that data depicted in FIG. 1 within storage processor 14 (e.g., app rules 34, generic rules 36, facts 22) as well as the programs (e.g., inference engine 26) are stored within memory 46 and executed by processor 44.

Processor 44 takes the form of, but is not limited to, Intel® or AMD®-based MPUs, and can include a single or multi-cores each running single or multiple threads. In some arrangements, processor 44 is one of several processors working together.

In some arrangements, processor 44 is configured to run a browser script in order for processor 44 to display a user interface within a browser window that allows a user to input values of provisioning target parameters for conversion into facts 22.

In some other arrangements, storage processor 14 obtains local rules in knowledge base 24 from a remote knowledge base. In other arrangements, storage processor 14 sends local rules in knowledge base 24 to the remote knowledge base for storage. An advantage in such an interaction is in re-use of these rules within other platforms. Further details of such arrangements are discussed below with respect to FIG. 3.

Figure 3:
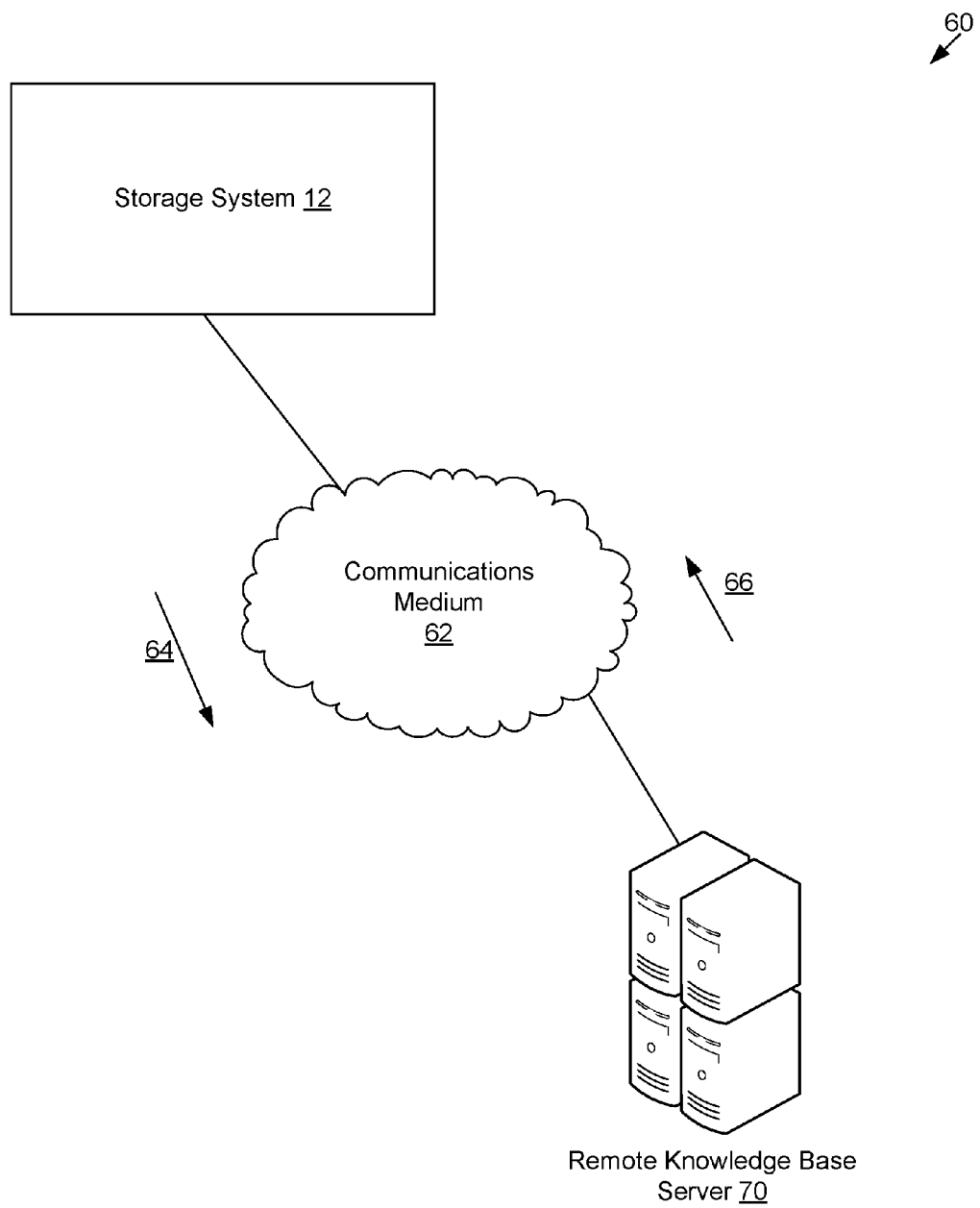
FIG. 3 is a block diagram illustrating another electronic environment for carrying out the improved technique.

FIG. 3 illustrates another electronic environment 60 for interacting with a remote, or centralized, knowledge base. Electronic environment 60 includes storage system 12, communications medium 62, and remote knowledge base server 70.

Communication medium 62 provides network connections between storage system 12 and remote knowledge base server 70. Communications medium 62 may implement a variety of protocols such as TCP/IP, UDP, ATM, Ethernet, Fibre Channel, combinations thereof, and the like. Furthermore, communications medium 62 may include various components (e.g., cables, switches/routers, gateways/bridges, NAS/SAN appliances/nodes, interfaces, etc.). Moreover, the communications medium 62 is capable of having a variety of topologies (e.g., queue manager-and-spoke, ring, backbone, multi drop, point to-point, irregular, combinations thereof, and so on).

Remote knowledge base server 70 is configured to store various logical statements 64 that may represent knowledge relevant to deriving provisions for storage array 28 (see FIG. 1), but also may be relevant to other storage arrays (not pictured) and other, non-storage platforms (not pictured). Remote knowledge base server 70 is also configured to send to storage system 12 other logical statements 66, derived from other platforms, relevant to storage array 28. Remote knowledge base server 70 stores a database having entries corresponding to the logical statements 64 and 66 that takes the form of a relational database that uses SQL, although in some arrangements, that database is a non-SQL database.

Figure 4:
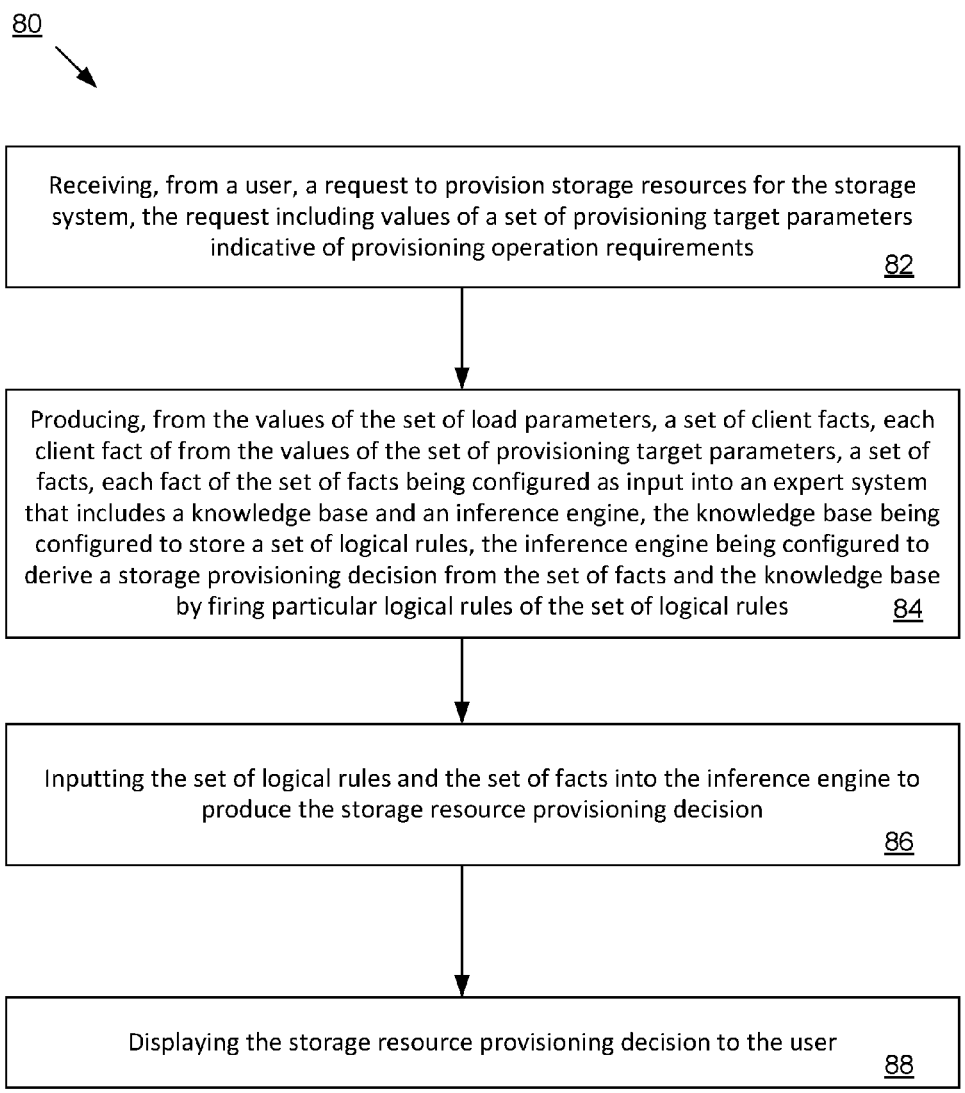
FIG. 4 is a flow chart illustrating an example method of carrying out the improved technique within the electronic environment shown in FIG. 1.

FIG. 4 illustrates an example method 80 of carrying out the improved technique, including steps 82, 84, 86, and 88. In step 82, a server, e.g., storage processor 14 receives, from a user, a request, i.e., request 16, to provision storage resources for the storage system, i.e., input from user, the request including values of a set of provisioning target parameters indicative of provisioning operation requirements. In step 84, the server produces, from the values of the set of provisioning targets parameters, a set of facts, e.g. facts 22, each fact of the set of facts being configured as input, i.e., command 30, into an expert system, e.g., expert system 20, that includes a knowledge base and an inference engine, the knowledge base, e.g., knowledge base 24, being configured to store a set of logical rules, the inference engine, e.g., inference engine 26, being configured to derive a storage provisioning decision 32 from the set of facts and the knowledge base by firing particular logical rules of the set of logical rules. In step 86, the server inputs the set of logical rules and the set of client facts into the inference engine to produce the storage resource provisioning decision 32. In step 88, the system displays the storage resource provisioning decision 32 to the user, or uses it for a subsequent automatic provisioning operation.

While various embodiments of the invention have been particularly shown and described, it will be understood by those skilled in the art that various changes in form and details may be made therein without departing from the spirit and scope of the invention as defined by the appended claims.

For example, request 16 from the user, i.e., the input of the values of the provisioning target parameters, may be input by the user at the storage processor 14. In some arrangements, however, the user may send request 16 to storage processor 14 from a remote location.

Furthermore, it should be understood that some embodiments are directed to storage processor 14, which is constructed and arranged to provision storage resources for a storage system of a client. Some embodiments are directed to a process of provisioning storage resources for a storage system of a client. Also, some embodiments are directed to a computer program product which enables computer logic to provision storage resources for a storage system of a client.

In some arrangements, storage processor 14 is implemented by a set of processors or other types of control/processing circuitry running software. In such arrangements, the software instructions can be delivered, within storage processor 14, in the form of a computer program product 120 (see FIG. 2), each computer program product having a non-transitory computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of provisioning storage resources for a storage system, the method comprising:
   receiving, from a user, a request to provision storage resources for the storage system, the request including values of a set of provisioning target parameters indicative of provisioning operation requirements;
   producing, from the values of the set of provisioning target parameters, a set of facts, each fact of the set of facts being configured as input into an expert system that includes a knowledge base and an inference engine, the knowledge base being configured to store a set of logical rules, the inference engine being configured to derive a storage provisioning decision from the set of facts and the knowledge base by firing particular logical rules of the set of logical rules;
   inputting the set of logical rules and the set of facts into the inference engine to produce the storage resource provisioning decision; and
   displaying the storage resource provisioning decision to the user;
   wherein the set of provisioning target parameters includes parameters that specify provisioning operation requirements for a provisioning target;
   wherein producing the set of facts includes defining a provisioning target fact template based on the provisioning target;
   wherein each rule of the set of logical rules includes a precondition and an action that follows when the precondition is true;
   wherein the set of logical rules of the knowledge base includes a set of provisioning rules configured to be fired by the inference engine in the presence of facts conforming to the provisioning target fact template; and wherein inputting the set of logical rules and the set of facts into the inference engine includes providing a command to the inference engine to fire a provisioning rule of the set of provisioning rules when the precondition of the provisioning rule matches a fact of the set of facts.

2. The method of claim 1,
wherein producing the set of facts further includes:
generating, as a fact of the set of facts, a text string conforming to the provisioning target fact template.

3. The method of claim 1,
wherein the knowledge base further includes a set of generic rules that represents a generic data manipulation pattern;
wherein inputting the set of logical rules and the set of facts into the inference engine further includes:
providing a command to the inference engine to fire a generic rule of the set of generic rules when the generic rule is input into the inference engine.

4. The method of claim 1, further comprising:
providing an administrative interface that is configured to i) provide a graphical user interface on a storage processing device from which the user inputs the values of the set of provisioning target parameters, and ii) transmit the request on the storage processing device.

5. The method of claim 1, wherein the knowledge base includes a centralized knowledge base located remote from the inference engine;
wherein inputting the set of logical rules and the set of facts into the inference engine includes:
obtaining logical rules from the centralized knowledge base having preconditions matching a fact of the set of facts.

6. The method of claim 1, further comprising:
performing a subsequent automatic provisioning operation based on the storage resource provisioning decision.

7. The method of claim 2, wherein the parameters that specify provisioning operation requirements for the provisioning target include an application identifier identifying an application and lower and upper bounds of a storage utilization of the application, and
wherein generating the text string conforming to the provisioning target fact template includes obtaining the application identifier, the lower bound, and the upper bound.

8. An apparatus constructed and arranged to provision resources for a storage system, the apparatus including:
a network interface;
memory; and
a controller including controlling circuitry coupled to the memory, the controlling circuitry being constructed and arranged to:
receive, from a user, a request to provision storage resources for the storage system, the request including values of a set of provisioning target parameters indicative of provisioning operation requirements;
produce, from the values of the set of provisioning target parameters, a set of facts, each fact of the set of facts being configured as input into an expert system that includes a knowledge base and an inference engine, the knowledge base being configured to store a set of logical rules, the inference engine being configured to derive a storage provisioning decision from the set of facts and the knowledge base by firing particular logical rules of the set of logical rules;
input the set of logical rules and the set of facts into the inference engine to produce the storage resource provisioning decision; and
display the storage resource provisioning decision to the user;
wherein the set of provisioning target parameters includes parameters that specify provisioning operation requirements; and
wherein producing the set of facts includes defining a provisioning target fact template based on the provisioning target;
wherein each rule of the set of logical rules includes a precondition and an action that follows when the precondition is true;
wherein the set of logical rules of the knowledge base includes a set of provisioning rules configured to be fired by the inference engine in the presence of facts conforming to the provisioning target fact template; and
wherein inputting the set of logical rules and the set of facts into the inference engine includes providing a command to the inference engine to fire a provisioning rule of the set of provisioning rules when the precondition of the provisioning rule matches a fact of the set of facts.

9. The apparatus of claim 8,
wherein producing the set of facts includes:
generating, as a fact of the set of facts, a text string conforming to the provisioning target fact template.

10. The apparatus of claim 8,
wherein the knowledge base further includes a set of generic rules that represents a generic data manipulation pattern;
wherein inputting the set of logical rules and the set of facts into the inference engine further includes:
providing a command to the inference engine to fire a generic rule of the set of generic rules when the generic rule is input into the inference engine.

11. The apparatus of claim 8,
wherein the controlling circuitry is further constructed and arranged to:
provide an administrative interface that is configured to i) provide a graphical user interface on a storage processing device from which the user inputs the values of the set of provisioning target parameters, and ii) transmit the request on the storage processing device.

12. The apparatus of claim 8, wherein the knowledge base includes a centralized knowledge base located remote from the inference engine;
wherein inputting the set of logical rules and the set of facts into the inference engine further includes:
obtaining logical rules from the centralized knowledge base having preconditions matching a fact of the set of facts.

13. The apparatus of claim 8, wherein the controlling circuitry is further constructed and arranged to:
perform a subsequent automatic provisioning operation based on the storage resource provisioning decision.

14. The apparatus of claim 9, wherein the parameters that specify provisioning operation requirements for the provisioning target include an application identifier identifying an application and lower and upper bounds of a storage utilization of the application, and
wherein the controlling circuitry, when constructed and arranged to generate the text string conforming to the provisioning target fact template is further constructed and arranged to obtain the application identifier, the lower bound, and the upper bound.

15. A computer program product having a non-transitory, computer-readable storage medium which stores code for provisioning resources for a storage system, the code including instructions which, when executed by a computer, cause the computer to:
- receive, from a user, a request to provision storage resources for the storage system, the request including values of a set of provisioning target parameters indicative of provisioning operation requirements;
- produce, from the values of the set of provisioning target parameters, a set of facts, each fact of the set of facts being configured as input into an expert system that includes a knowledge base and an inference engine, the knowledge base being configured to store a set of logical rules, the inference engine being configured to derive a storage provisioning decision from the set of facts and the knowledge base by firing particular logical rules of the set of logical rules;
- input the set of logical rules and the set of facts into the inference engine to produce the storage resource provisioning decision; and
- display the storage resource provisioning decision to the user;
- wherein the set of provisioning target parameters includes parameters that specify provisioning operation requirements; and
- wherein producing the set of facts includes defining a provisioning target fact template based on the provisioning target;
- wherein each rule of the set of logical rules includes a precondition and an action that follows when the precondition is true;
- wherein the set of logical rules of the knowledge base includes a set of provisioning rules configured to be fired by the inference engine in the presence of facts conforming to the provisioning target fact template; and
- wherein inputting the set of logical rules and the set of facts into the inference engine include providing a command to the inference engine to fire a provisioning rule of the set of provisioning rules when the precondition of the provisioning rule matches a fact of the set of facts.

16. The computer program product of claim 15,
wherein producing the set of facts includes:
generating, as a fact of the set of facts, a text string conforming to the provisioning target fact template.

17. The computer program product of claim 15,
wherein the knowledge base further includes a set of generic rules that represents a generic data manipulation pattern;
wherein inputting the set of logical rules and the set of facts into the inference engine further includes:
providing a command to the inference engine to fire a generic rule of the set of generic rules when the generic rule is input into the inference engine.

18. The computer program product of claim 15,
wherein the code includes further instructions which, when executed by the computer, cause the computer to:
provide an administrative interface that is configured to i) provide a graphical user interface on a storage processing device from which the user inputs the values of the set of provisioning target parameters, and ii) transmit the request on the storage processing device.

19. The computer program product of claim 15, wherein the code includes further instructions which, when executed by the computer, causes the computer to:
perform a subsequent automatic provisioning operation based on the storage resource provisioning decision.

20. The computer program product as in claim 16, wherein the parameters that specify provisioning operation requirements for the provisioning target include an application identifier identifying an application and lower and upper bounds of a storage utilization of the application, and
wherein the instructions that, when executed by the computer, cause the computer to generate the text string conforming to the provisioning target fact template further cause the computer to obtain the application identifier, the lower bound, and the upper bound.

* * * * *